US012679329B2

(12) United States Patent
Ahn et al.

(10) Patent No.: US 12,679,329 B2
(45) Date of Patent: Jul. 14, 2026

(54) HYBRID ELECTRIC VEHICLE AND METHOD OF DRIVING CONTROL THEREFOR

(71) Applicants: HYUNDAI MOTOR COMPANY, Seoul (KR); KIA CORPORATION, Seoul (KR)

(72) Inventors: Tae Jun Ahn, Suwon-si (KR); Jong Bum Oh, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 564 days.

(21) Appl. No.: 17/949,514

(22) Filed: Sep. 21, 2022

(65) Prior Publication Data

US 2023/0347868 A1 Nov. 2, 2023

(30) Foreign Application Priority Data

May 2, 2022 (KR) ........................ 10-2022-0054304

(51) Int. Cl.
B60W 20/15 (2016.01)
B60K 6/46 (2007.10)
(Continued)

(52) U.S. Cl.
CPC ............ B60W 20/15 (2016.01); B60W 10/02 (2013.01); B60W 10/08 (2013.01); B60W 10/11 (2013.01);
(Continued)

(58) Field of Classification Search
CPC ...... B60W 20/15; B60W 10/02; B60W 10/08; B60W 10/11; B60W 20/30; B60W 2510/0657; B60W 2510/083; B60W 2510/1005; B60W 2710/021; B60W 2710/083; B60W 2710/1005;
(Continued)

(56) References Cited

U.S. PATENT DOCUMENTS 8,983,703 B2 3/2015 Akebono et al.
10,518,766 B2 12/2019 Hata et al.
(Continued)

FOREIGN PATENT DOCUMENTS

JP 2002147589 A * 5/2002 .......... B60W 30/182
JP 2018002120 A * 1/2018
(Continued)

*Primary Examiner* — Ellis B. Ramirez
(74) *Attorney, Agent, or Firm* — Lempia Summerfield Katz LLC

(57) ABSTRACT

Disclosed are a hybrid electric vehicle and a driving control method therefor, which are capable of switching to a driving mode and performing a kick-down shift more quickly. In particular, the method for controlling the hybrid electric vehicle includes: determining a first motor directly connected to an engine and an available torque in a target gear of each second motors connected to the first motor when a driving mode is changed from an electric vehicle (EV) mode to a hybrid electric vehicle (HEV) mode and a kick-down shift is required simultaneously; and determining operating points of the first motor and the second motor before an actual shift ends, based on the determined available torque and the type of kick-down shift.

19 Claims, 5 Drawing Sheets

(51) Int. Cl.

| | |
|---|---|
| *B60W 10/02* | (2006.01) |
| *B60W 10/08* | (2006.01) |
| *B60W 10/11* | (2012.01) |
| *B60W 20/30* | (2016.01) |
| *F16H 61/04* | (2006.01) |

(52) U.S. Cl.

CPC ......... *B60W 20/30* (2013.01); *F16H 61/0437* (2013.01); *B60K 6/46* (2013.01); *B60W 2510/0657* (2013.01); *B60W 2510/083* (2013.01); *B60W 2510/1005* (2013.01); *B60W 2710/021* (2013.01); *B60W 2710/083* (2013.01); *B60W 2710/1005* (2013.01); *B60Y 2200/92* (2013.01); *F16H 2061/0444* (2013.01)

(58) Field of Classification Search

CPC ... B60W 2540/103; B60W 2710/0666; B60W 10/06; B60W 20/19; B60W 20/20; B60W 20/10; B60W 20/40; B60W 10/10; B60W 30/182; B60W 2510/1025; F16H 61/0437; F16H 2061/0444; F16H 63/502; F16H 59/20; F16H 2061/0433; B60K 6/46; B60K 6/442; B60K 2006/4825; B60K 6/48; B60K 6/547; B60K 6/26; B60K 6/28; B60K 6/38; B60Y 2200/92; Y02T 10/62

USPC ......... 701/22; 903/946, 915, 917; 180/65.28

See application file for complete search history.

(56) References Cited

U.S. PATENT DOCUMENTS

| | | | | |
|---|---|---|---|---|
| 2002/0112901 | A1 | 8/2002 | Yamaguchi et al. | |
| 2003/0181276 | A1* | 9/2003 | Minagawa | B60K 6/445 |
| | | | | 903/910 |
| 2005/0102082 | A1* | 5/2005 | Joe | B60W 10/10 |
| 2007/0056784 | A1 | 3/2007 | Joe et al. | |
| 2007/0114082 | A1* | 5/2007 | Nozaki | B60L 50/16 |
| | | | | 180/65.6 |
| 2008/0318726 | A1* | 12/2008 | Matsubara | B60W 10/08 |
| 2011/0320075 | A1* | 12/2011 | Kim | B60W 30/192 |
| 2012/0053767 | A1* | 3/2012 | Jeon | B60W 10/02 |
| | | | | 903/902 |
| 2013/0311027 | A1* | 11/2013 | Toyota | B60W 10/11 |
| | | | | 701/22 |
| 2017/0166192 | A1* | 6/2017 | Jeon | B60K 6/387 |
| 2017/0334424 | A1* | 11/2017 | Kato | B60W 10/08 |
| 2018/0099654 | A1* | 4/2018 | Shin | B60W 10/10 |
| 2018/0118191 | A1* | 5/2018 | Park | B60W 10/08 |
| 2018/0141429 | A1* | 5/2018 | Cho | B60K 6/48 |
| 2019/0071066 | A1* | 3/2019 | Imamura | B60K 6/365 |
| 2022/0169122 | A1* | 6/2022 | Jang | B60L 50/60 |

FOREIGN PATENT DOCUMENTS

| | | | |
|---|---|---|---|
| KR | 101866061 | B1 | 6/2018 |
| KR | 101964771 | B1 | 4/2019 |
| KR | 102323959 | B1 | 11/2021 |

* cited by examiner

FIG. 5

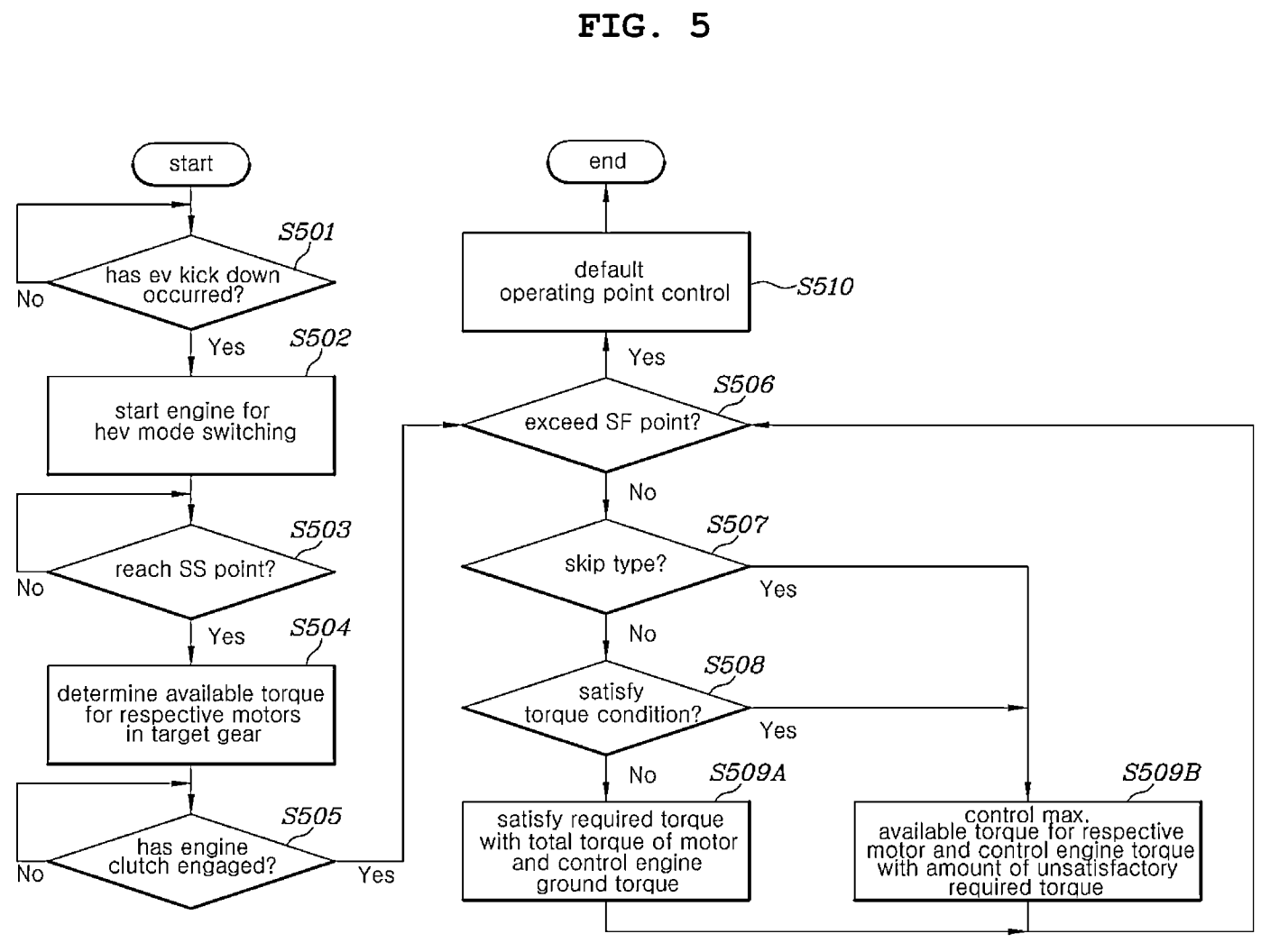

```
start
  │
  ▼
S501 ─ has ev kick down occurred? ─ No ─┐
  │ Yes                                  │
  ▼                                      │ (loop back)
S502  start engine for                   │
      hev mode switching                 │
  │                                      │
  ▼                                      │
S503 ─ reach SS point? ─ No ─────────────┘
  │ Yes
  ▼
S504  determine available torque
      for respective motors
      in target gear
  │
  ▼
S505 ─ has engine clutch engaged? ─ No ─ (loop back)
  │ Yes
  ▼
S506 ─ exceed SF point? ─ Yes ─▶ S510  default operating point control ─▶ end
  │ No
  ▼
S507 ─ skip type? ─ Yes ─────────────────────────┐
  │ No                                            │
  ▼                                               ▼
S508 ─ satisfy torque condition? ─ Yes ─▶ S509B  control max.
  │ No                                     available torque for respective
  ▼                                        motor and control engine torque
S509A  satisfy required torque              with amount of unsatisfactory
       with total torque of motor           required torque
       and control engine
       ground torque
```

HYBRID ELECTRIC VEHICLE AND METHOD OF DRIVING CONTROL THEREFOR

CROSS REFERENCE TO RELATED APPLICATION

This application claims priority to and the benefit of Korean Patent Application No. 10-2022-0054304, filed May 2, 2022, the entire contents of which are incorporated herein by reference.

TECHNICAL FIELD

The present disclosure relates to a hybrid electric vehicle and driving control method therefor, which is capable of switching to a driving mode and performing a kick-down shift.

BACKGROUND

The statements in this section merely provide background information related to the present disclosure and may not constitute prior art.

Recently, as interest in the environment increases, environment-friendly vehicles having an electric motor as a power source are increasing. An environment-friendly vehicle is also referred to as an electric vehicle and can be exemplified as a hybrid electric vehicle (HEV) or an electric vehicle (EV).

When the hybrid electric vehicle having a discrete variable transmission travels by only a driving force of an electric motor, namely, in an EV mode, and a high torque is demanded according to the driver's operation of the accelerator pedal, there may be a situation in which both of switching a driving mode to a HEV mode to use the driving force of an engine and a kick-down shift are required.

In addition to the driving motor, the hybrid electric vehicle is provided with a starter generator motor to start the engine or generate electric power. The starter generator motor is connected to the engine by a pulley and a belt, and thus reactivity and accuracy are insufficient to control the torque transmitted to the drive shaft, and also a problem may occur in the durability of the belt. Accordingly, often there are cases where the output torque of the driving motor to satisfy the required torque that is not high enough to cause the kick-down shift, and since it is difficult for the starter-generator motor to provide additional torque to the drive shaft, the engine has to increase the torque after switching to the HEV mode quickly. However, there may be a high possibility that a mismatch between the modeling torques used to control and an actual torque in the engine torque. Therefore, setting a limit to a rate of increase of torque is common. Even if the limit to the rate of increase of torque is set, a possibility of torque mismatch may still present. During kick-down shift control, a gearshift difference may arise due to torque of the transmission input terminal and hydraulic transmission mismatch in the actual shift section. In addition, as the rate of increase of torque is limited, the actual shift occurs as the total torque of the drive shaft rises slowly, so that shift standby time may be longer, which causes a gear-shifting and accelerating-delay sensation.

SUMMARY

The present disclosure provides a hybrid electric vehicle and driving control method therefor, which is capable of switching a driving mode and performing a kick-down shift more quickly.

Technical objects to be achieved by the present disclosure are not limited to the technical objects described above, and other technical objects not described should be clearly understood by those having ordinary skill in the art to which the present disclosure pertains.

According to one aspect of the present disclosure, a method for controlling a hybrid electric vehicle includes: when switching from an electric vehicle (EV) mode to a hybrid electric vehicle (HEV) mode and a kick-down shift are required together, determining available torque in respective target gears of a first motor directly connected to the engine and a second motor connected to the first motor in the HEV mode. The method further includes determining operating points of the first motor and the second motor before an actual shift ends, based on the determined respective available torques and types of the kick-down shift.

In one embodiment, determining the available torque may be performed from a shift control start point during a shift phase after the engine is started.

In another embodiment, determining the available torque may be performed after the engine clutch disposed between the first motor and the second motor is engaged.

In one embodiment, the type of kick-down shifts may include a first type in which the target gear is one end lower than the current gear and a second type in which the target gear is two or more ends lower than the current gear.

In one embodiment, when the type of the kick-down shift is the first type, determining the operating point may include determining whether a predetermined torque condition is satisfied based on the determined respective available torques, an actual engine output torque, and a required torque.

In one embodiment, the torque condition may be satisfied when the difference between a value obtained by subtracting the actual engine output torque from the required torque and the sum of the determined respective available torques is greater than or equal to the preset reference value.

For example, when the torque condition is satisfied, or the type of kick-down shift is the second type, determining the operating point may further include: determining the torque of the first motor and the second motor as the determined respective available torques; and determining the torque of the engine as the difference between the required torque and the sum of the determined respective available torques.

When the torque condition is not satisfied, determining the operating point may further include: determining a torque of the engine as a ground torque; and determining the torques of the first motor and the second motor to satisfy a value obtained by subtracting the actual engine output torque from the required torque.

In one embodiment, the actual engine output torque may be a value obtained by subtracting a friction torque of the engine from the ground torque.

In another embodiment of the present disclosure, a hybrid electric vehicle may include: an engine; a first motor directly connected to the engine; and a second motor which operates in an electric vehicle (EV) mode and is connects to the first motor in a hybrid electric vehicle (HEV) mode. The hybrid electric vehicle further includes: a transmission of which an input shaft is connected to the second motor; and a control unit. In particular, when a switching driving mode from the electric vehicle (EV) mode to the hybrid electric vehicle (HEV) mode and a kick-down shift are required together, the control unit determines an available torque in target gears of the first motor and the second motor, respectively, and also determines the operating point of the engine, the first motor, and the second motor before the actual shift ends, based on the determined respective available torques and the type of kick-down shift.

In one embodiment, the control unit may determine the available torque from a shift control start point during a shift phase after the engine is started.

In another embodiment, the control unit may determine the operating point after the engine clutch is engaged. The engine clutch is disposed between the first motor and the second motor.

In one embodiment, the type of kick-down shift may include a first type in which the target gear is one gear stage lower than the current gear and a second type in which the target gear is two or more gear stages lower than the current gear.

In one embodiment, when the type of the kick-down shift is the first type, the control unit may determine whether the preset torque condition is satisfied based on the determined respective available torques, actual engine output torque, and required torque.

In another embodiment, the torque condition may be satisfied when the difference between a value obtained by subtracting the actual engine output torque from the required torque and the sum of the determined respective available torques is greater than or equal to the preset reference value.

When the torque condition is satisfied, or the type of the kick-down shift is the second type, the control unit may determine the torque of the first motor and the second motor as the determined respective available torques and determine the torque of the engine as a difference between the required torque and the sum of the determined respective available torques.

In one embodiment, when the torque condition is not satisfied, the control unit may determine the torque of the engine as a ground torque; and determine the torques (i.e., the total torque) of the first motor and the second motor to satisfy a value obtained by subtracting the actual engine output torque from the required torque.

In one embodiment, the actual engine output torque may be a value obtained by subtracting a friction torque of the engine from the ground torque.

As described above, according to various embodiments, performing a drive shaft torque control with a motor directly connected to the engine may be performed quickly when a switching driving mode and a kick-down shift are required together.

It will be appreciated by persons of ordinary skilled in the art that the effects that can be achieved with the present disclosure are not limited to what has been particularly described herein above and other advantages of the present disclosure will be more clearly understood from the following detailed description taken in conjunction with the accompanying drawings.

BRIEF DESCRIPTION OF THE DRAWINGS

In order that the disclosure may be well understood, there will now be described various forms thereof, given by way of example, reference being made to the accompanying drawings, in which:

FIG. 5 is a flowchart showing an example of a process of performing a type of EV kick-down control in a hybrid electric vehicle according to an embodiment of the present disclosure.

Figure 1:
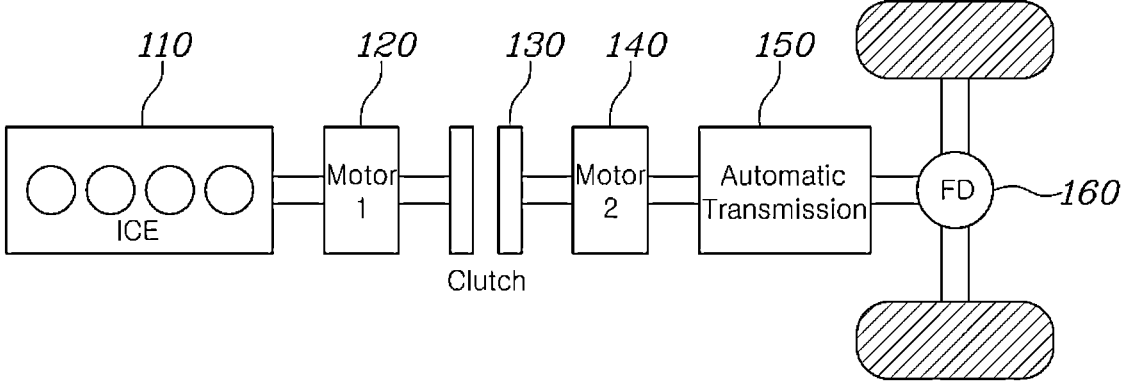
FIG. 1 is a view showing an example of a configuration of a powertrain of a hybrid electric vehicle according to an embodiment of the present disclosure.

The drawings described herein are for illustration purposes only and are not intended to limit the scope of the present disclosure in any way.

DETAILED DESCRIPTION OF THE DISCLOSURE

Hereinafter, embodiments of the present disclosure are described in greater detail with reference to the accompanying drawings. In describing the present disclosure, for ease of understanding, the same reference numerals are used to denote the same components throughout the drawings, and repetitive description on the same components have been omitted. In the following description, with respect to constituent elements used in the following description, suffixes "module" and "unit" are given in consideration of only facilitation of description and do not have meaning or functions discriminated from each other. In addition, in the following description of the embodiments disclosed in the present specification, a detailed description of known functions and configurations incorporated herein has been omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and spirit of the present disclosure.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises," "includes," etc. specify the presence of stated features, integers, steps, operations, elements, components, or combinations thereof, but do not preclude the presence or addition of one or more other features, integers, steps, operations, elements, components, or combinations thereof. When a component, device, element, or the like of the present disclosure is described as having a purpose or performing an operation, function, or the like, the component, device, or element should be considered herein as being "configured to" meet that purpose or to perform that operation or function.

In addition, a unit or a control unit in a name such as a motor control unit (MCU) and a hybrid control unit (HCU) is a term widely used in the name of a controller that controls a vehicle-specific function and does not imply to a general function unit. For example, each controller is a communication device that communicates with other controllers or sensors to control the function that is responsible for, a memory that stores an operating system or logic commands and input/output information, and one or more processor that performs determination, calculation, decision, and the like, which is necessary for the control the function that is responsible therefor.

Prior to explaining a hybrid electric vehicle and a control method thereof according to an embodiment of the present disclosure, descriptions are firstly made on the structure of a hybrid electric vehicle and control system capable of applying to embodiments.

FIG. 1 is a view showing an example of a configuration of a powertrain of a hybrid electric vehicle according to an embodiment of the present disclosure.

In FIG. 1, the powertrain of the hybrid electric vehicle includes two motors 120 and 140, which are mounted between an engine (internal combustion engine, ICE) 110 and a transmission 150, and an engine clutch 130, which employs a parallel type hybrid system. Such a parallel type hybrid system is also called a transmission mounted electric drive (TMED) hybrid electric system since a motor 140 is always connected to an input terminal of the transmission 150.

Here, the first motor 120 of the two motors 120 and 140 is disposed between the engine 110 and one end of the engine clutch 130, and an engine shaft of the engine 110 and a first motor shaft of the first motor 120 are variably connected to rotate together at all times.

One end of a second motor shaft of the second motor 140 may be connected to the other end of the engine clutch 130, and the other end of the second motor shaft may be connected to the input terminal of the transmission 150.

The second motor 140 has a greater output than the first motor 120, and the second motor 140 may perform as a driving motor. In addition, the first motor 120 may perform as a starter motor to crank the engine 110 when the engine 110 starts. When the engine is off, the rotational energy of the engine 110 can be recovered through power generation. The power generation may be performed with the power of the engine 110 while the engine 110 is in operation.

As shown in FIG. 1, when a driver depresses an accelerator pedal after starting (for example, HEV Ready), in the hybrid electric vehicle having the powertrain, the second motor 140 may be driven using the electrical power of a battery (not shown) in a state in which the engine clutch 130 is opened. Accordingly, the power of the second motor 140 passes through the transmission 150 and a final drive (FD) 160 to move a wheel (i.e., EV mode). When a vehicle is gradually accelerated and a larger driving force is required, the first motor 120 may operate to crank the engine 110.

After the engine 110 is started, and the difference in rotational speed between the engine 110 and the second motor 140 is within a predetermined range, the engine clutch 130 is engaged, and the engine 110 and the second motor 140 may be rotated together (i.e., a transition from EV mode to HEV mode). Accordingly, through a torque blending process, the output of the second motor 140 may be decreased, and the output of the engine 110 is increased. Therefore a driver's demand torque may be satisfied. In the HEV mode, most of the demand torque may be satisfied from the engine 110. The difference between engine torque and the demand torque may be compensated through at least one of the first motor 120 and the second motor 140. For example, when the engine 110 outputs a torque higher than the demand torque considering the efficiency of the engine 110, either the first motor 120 or the second motor 140 may generate power to the extent of the redundancy of the engine torque. When the engine torque exceeds the demand torque, at least one of the first motor 120 and the second motor 140 may output the deficit torque.

A predetermined engine off condition, such as a decelerating vehicle, is satisfied, the engine clutch 130 may be opened, and the engine 110 may be stopped (i.e., a transition from HEV mode to EV mode). When decelerating, by using the driving force of the wheel, a battery may be recharged through the second motor 140, which is referred to as braking energy regeneration or regenerative braking.

In general, the transmission 150 may use a discrete variable transmission or a multiple-disc clutch, such as a dual clutch transmission (DCT).

Figure 2:
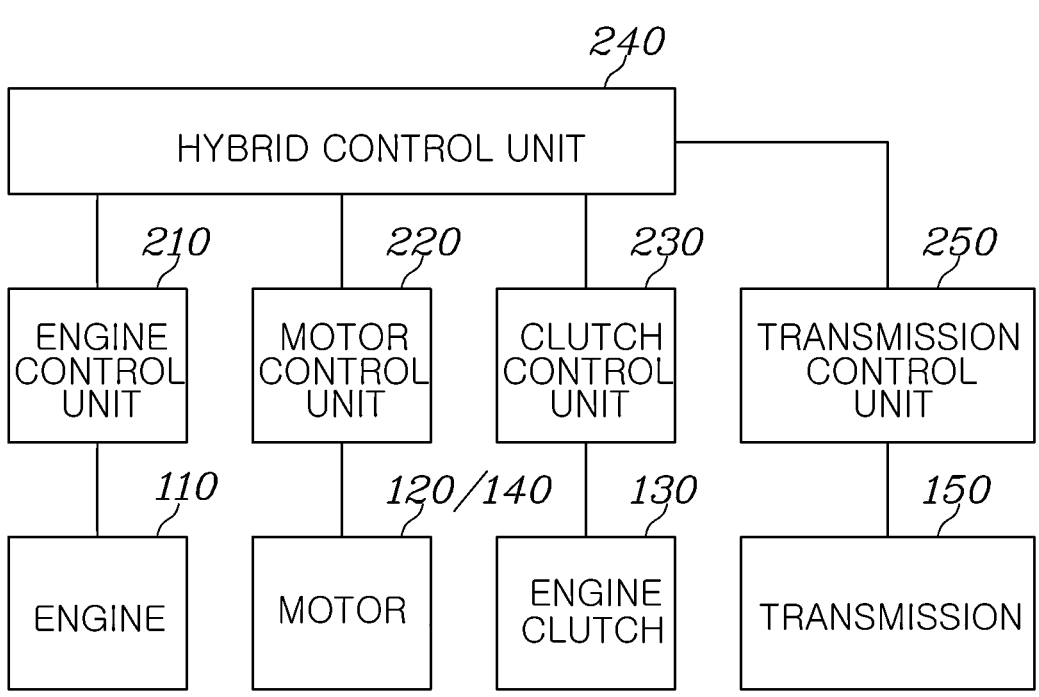
FIG. 2 is a view showing an example of a configuration of a control system of a hybrid electric vehicle according to an embodiment of the present disclosure.

FIG. 2 is a view showing an example of a configuration of a control system of a hybrid electric vehicle according to an embodiment of the present disclosure.

In FIG. 2, the engine 110 of the hybrid vehicle to which embodiments of the present disclosure can be applied may be controlled by an engine control unit 210, the first motor 120 and the second motor 140 may be controlled by a motor control unit (MCU) 220, and the engine clutch 130 may be controlled by a clutch control unit 230, respectively. Here, the engine control unit 210 is also referred to as an engine control system (EMS). In addition, the transmission 150 may be controlled by a transmission control unit 250.

The MCU 220 transmits a pulse width modulation (PWM) control signal to a gate drive unit (not shown) based on a motor angle, phase voltage, phase current, demand torque, and the like of each of the motors 120 and 140. The gate drive unit may control an inverter (not shown) that drives each of the motors 120 and 140 accordingly.

Each control unit may be connected to a hybrid control unit (HCU) 240 that controls the overall powertrain, including a mode switching process, which is an upper-level control unit thereof, and may provide the HCU 240 with the information required to control the engine clutch when shifting gears or changing driving mode, and/or the information required to stop the engine according to the control of the HCU 240 or perform an operation according to a control signal.

For example, the HCU 240 may determine whether to perform switching between EV-HEV modes or CD-CS mode (in the case of PHEV) according to the driving state of the vehicle. To this end, the HCU determines when the engine clutch 130 is opened and performs a hydraulic control when opened. In addition, the HCU 240 may determine a state (lock-up, slip, open, etc.) of the engine clutch 130, and may control the timing of stopping the fuel injection of the engine 110. In addition, the HCU may send a torque command for controlling the torque of the first motor 120 to the MCU 220 for an engine stop control, thereby controlling the recovery of the engine rotational energy. In addition, the HCU 240 determines the state of each of the drive sources 110, 120, and 140 to satisfy the demand torque, and determines the required driving force to be shared by each of the drive sources 110, 120, and 140 according to the respective drive source, in which the respective drive source may send the torque command to the control units 210 and 220.

Of course, it is apparent to those having ordinary skill in the art that the aforementioned connection relationship and the function/classification of each control unit are exemplary and is non-limited by its name. For example, the HCU 240 may be implemented. The corresponding function is provided by replacing one of the other control units or may be provided in a distributed manner in two or more of the other control units.

It is apparent to those having ordinary skill in the art that the aforementioned configurations of FIGS. 1 and 2 are only examples of the hybrid electric vehicle, and the hybrid vehicle applicable to the embodiment is not limited to such a configuration.

As described above, in embodiments of the present disclosure, when a kick-down shift and a mode switching are required together, shift time is shortened and prevents torque mismatch by performing a drive shaft torque control using the first motor directly connected to the engine, thereby securing robustness of the gear-shifting sensation.

In addition, in embodiments of the present disclosure, whether to limit an engine torque may be determined by considering the type of kick-down shift. Here, the type of kick-down shift may include a sequential shift type in which the gearshift is sequentially lowered by one stage and a skip shift type in which the gearshift is shifted two or more stages lower than the current gear. The skip shift type may be applied when a higher acceleration (high torque required) is required compared to the sequential shift type. According to an embodiment, in the case of the skip shift type, the engine torque may not be limited, and in the case of the sequential shift type, determining whether to restrict the engine torque is determined based on the difference between the total available torque of the first motor 120 and the second motor 140 and the required torque in the target gear.

Further, determining the shift type may be performed in a form in which the transmission control unit 250 refers to a shift map according to an accelerator pedal position sensor (APS) value and a vehicle speed, and a determined result may be a form transmitted from the transmission control unit 250 to the HCU 240.

Hereinafter, a method for controlling a hybrid electric vehicle according to an embodiment of the present disclosure will be described with reference to FIGS. 3 and 4. In the following description, for convenience, a situation in which the kick-down shift in the EV mode and the switching to the HEV mode are required together will be referred to as "EV kick-down".

As described above, in an embodiment of the present disclosure, whether to limit the engine torque may be determined based on the shift type, the total available motor torque, and the required torque. First, a form of controlling the hybrid electric vehicle in the EV kick-down situation is described when the engine torque is limited with reference to FIG. 3.

Figure 3:
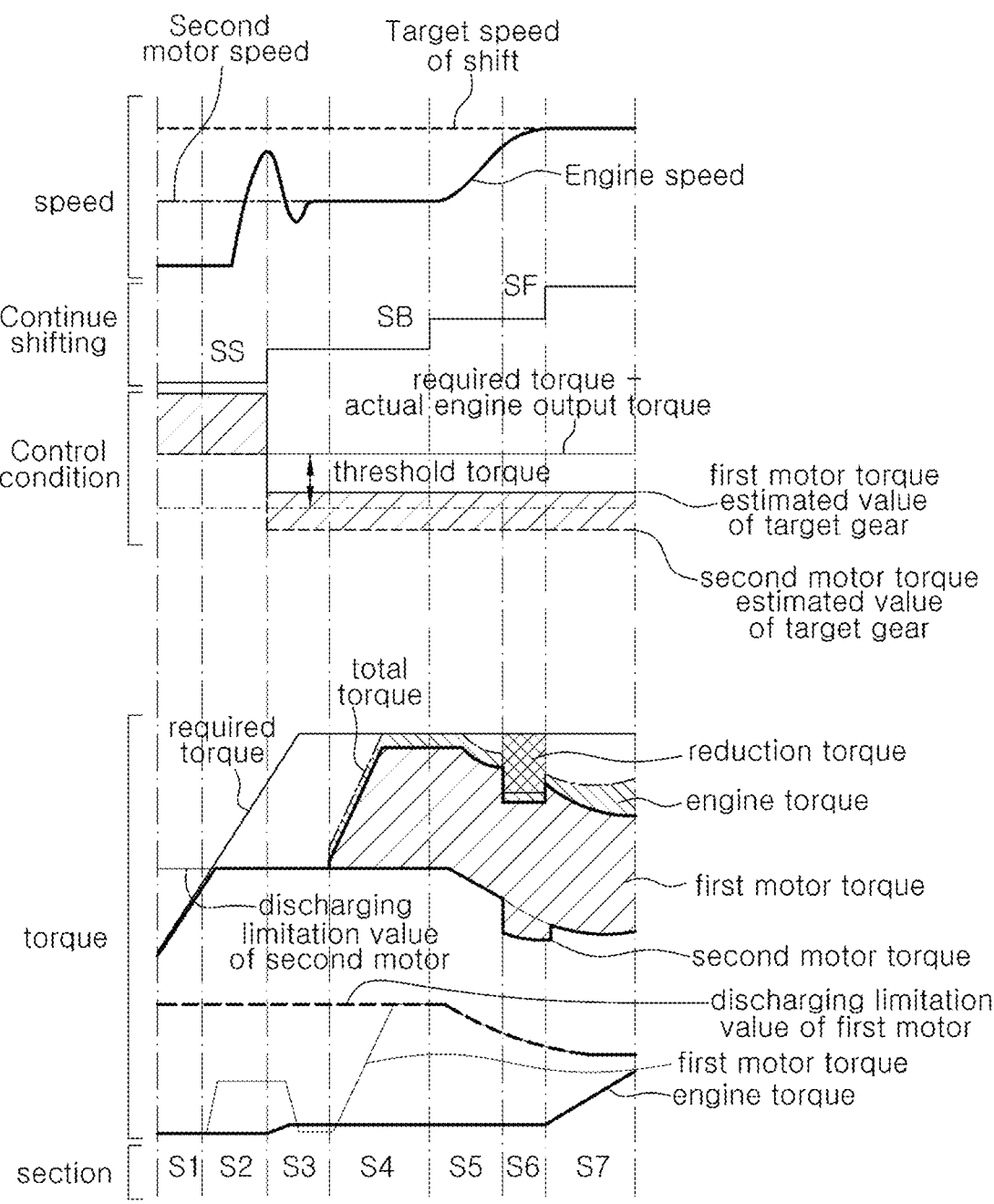
FIG. 3 is a view showing an example of a configuration of a type of EV kick-down control that limits an engine torque according to an embodiment of the present disclosure.

FIG. 3 is a view showing an example of a configuration of a type of EV kick-down control that limits an engine torque according to an embodiment of the present disclosure.

Referring to FIG. 3, firstly, in section S1, the HCU 240 may obtain information about a target gear, shift progress process (shift phase), and a shifting class (shift type) from the transmission control unit 250. In addition, the HCU 240 may determine whether to switch to the HEV mode according to the required torque during driving in the EV mode.

Accordingly, the HCU 240 determines the driving mode switching of the HEV and determines the EV kick-down, the situation in which the EV kick-down shift is notified from the transmission control unit 250 therewith.

In the EV kick-down situation, the HCU 240 may be on standby for information about the shift phase from the transmission control unit 250.

In addition, the HCU 240 may crank the engine 110 through the first motor 120 in section S2 according to determining the switching from the EV mode to the HEV mode.

When the transmission control unit 250 notifies (i.e., SS point detection) the shift control start (shift start, SS) at the start of section S3 while on standby for information on the shift phase, the HCU 240 may calculate the transmission input speed of a target gear to determine the respectively available torque of the first motor 120 and the second motor 140 from discharging limitation power, respectively. For example, available torque for the respective motor may be obtained by dividing the discharging limitation power for the respective motor by the transmission input speed of the target gear, but is not necessarily limited thereto.

The HCU 240 may determine whether to limit (use) the engine torque by comparing the calculated available torque of the respective motors with a value of 'required torque—actual torque (e.g., engine ground torque—engine friction torque).' Here, the engine ground torque may be a torque greater than or equal to the engine friction torque generated by mechanical friction during the engine rotation and may be defined as a torque value at a level that does not affect the state transition determination when the engine clutch 130 is engaged, and may be determined through an experiment for each vehicle, but is not necessarily limited thereto. In addition, a value obtained by subtracting the engine friction torque from the engine ground torque may be referred to as the 'actual engine output torque', which is an actual engine output torque of the engine 110 transmitted to the drive system (i.e., the transmission input terminal).

For example, when the required torque and the actual engine output torque are not more than a present torque threshold value, and the shift type is the sequential type, the HCU 240 may be controlled by the engine 110 to output only the ground torque to exclude the possibility of torque mismatch before a shift finish (SF) point (in FIG. 3, between sections S6 and S7). Such control is applied to the sequential shift because, considering that the driver requires relatively low acceleration, the sensation of acceleration may be lower than when the engine torque is used above the ground torque, but the robustness of the shift may be secured.

Returning to section S3, the engine clutch 130 may be joined as the engine start is completed.

In section S4, after the joining of the engine clutch 130 is completed, the torque of the first motor 120 and the engine 110 may be transmitted to the transmission input shaft, by which the input torque of the transmission may be increased at a high inclination using the torque of the first motor 120.

Accordingly, a high total torque may be obtained relatively early compared to a hybrid powertrain in which a starter-generator motor connected to the engine by a pulley is applied. Thus, the release solenoid of the transmission 150 may be released at a higher hydraulic pressure level.

Accordingly, the actual shifting point may be brought forward, and after the actual shifting begin (SB) point is detected in section S5 and before the actual shifting finish (SF) point is detected at the end of section S6, the HCU 240 may control the required torque dissatisfaction other than the actual engine output torque to be within the available torque in the order of the second motor 140 to the first motor 120.

In section S6, after detecting the SB point, as an intervention control for reducing the torque of the transmission input terminal is performed before the actual shift occurs, the reduction torque may be performed as the sum of the engine torque and the second motor torque. After the actual shift finish (SF) to which the target gear is engaged in the transmission 150 due to the reduction of the transmission input terminal torque by the reduction torque, the effect of the engine torque mismatch in terms of the sensation of gear-shifting sensation is not significant. Therefore, according to the default setting, the HCU 240 may determine the operating point of the respective drive source as a part-load or a full-load to satisfy the required torque.

Next, an EV kick-down control method in which the engine torque is not limited will be described.

In the skip shift type in which the driver demands a high acceleration, the HCU 240 may allow to output the engine torque to more than the ground torque by prioritizing the accelerating sensation over the gear-shifting sensation.

In addition, even in the case of sequential shift type, the torque level that can be output from the motor is limited depending on the temperatures of the motor and battery and a state of charge (SOC), so there may be a possibility of the total torque of two motors 120 and 140 do not satisfy the required torque significantly. For example, when there is a difference between a value obtained by subtracting the actual engine output torque from the required torque and the estimated value of the total available torque of two motors at the target gear by more than the pre-set value (torque threshold), the engine 110 may be allowed to output more than ground torque to satisfy the required torque.

A detailed form of the aforementioned EV kick-down control method is described with reference to FIG. 4. FIG. 4 is a view showing an example of a configuration of a type of EV kick-down control that uses an engine torque according to an embodiment of the present disclosure.

Figure 4:
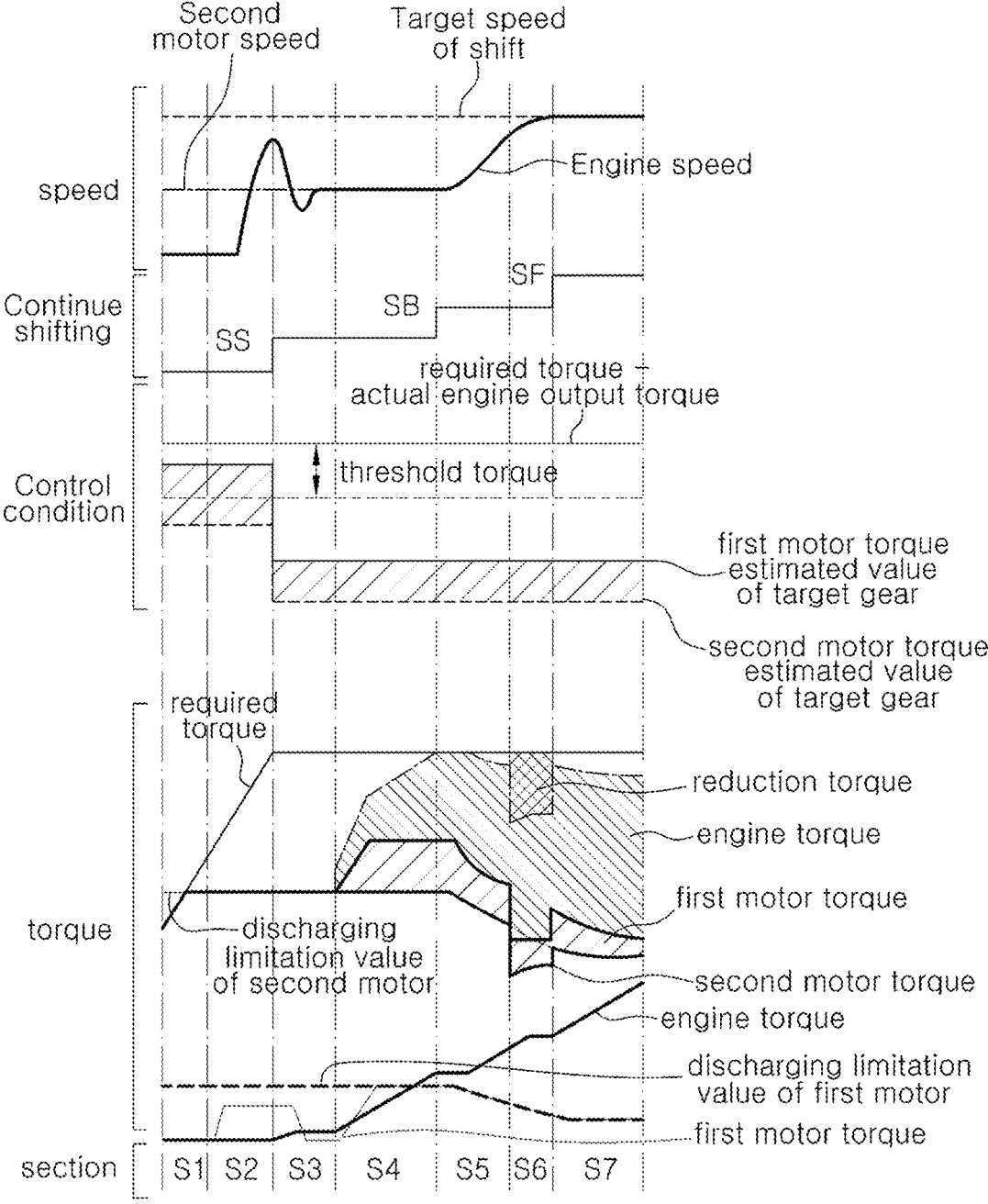
FIG. 4 is a view showing an example of a configuration of a type of EV kick-down control that uses an engine torque according to an embodiment of the present disclosure.

FIG. 4 is similar to FIG. 3 except that the engine torque is greater than the ground torque due to a difference between the value obtained by subtracting the engine output from the required torque and the estimated value of the total available torque of two motors in the target gear by more than a preset value (torque threshold). Therefore, the difference from FIG. 3 is mainly described.

When the engine torque is used more than the ground torque, the HCU 240 controls the first motor 120 and the second 140 to output a torque corresponding to the discharging limitation value among the available torques. The engine torque is controlled to output as much as the unsatisfactory amount of the required torque.

In a general hybrid powertrain in which the starter generator motor is connected to the engine by the pulley, the engine torque is first increased and then the driving motor is used to generate a torque (motor torque) to compensate for a torque difference between the engine torque and a required torque (e.g., a demand torque or a target torque). In FIG. 3, after the engine clutch 130 is engaged with the engine in section S3, the engine 110 outputs only the ground torque. On the other hand, in FIG. 4, after the HCU 240 confirms that the engine clutch 130 is engaged, the engine torque is controlled to output a torque compensating for a torque difference between the target torque and the total toque of the first motor 120 and the second motor 140. Accordingly, when the total torque of the first and second motors meets the required torque, the engine torque is not continuously increased and thus the effect of torque mismatch may be reduced. In addition, because the engine is controlled to generate a torque higher than the ground torque to provide a higher total torque to the transmission, the accelerating sensation is improved and the shift standby time is reduced.

Meanwhile, in the situation shown in FIG. 4, when the SS point is detected, the engine torque greater than or equal to the ground torque may be used without comparing a value obtained by subtracting the actual engine output torque from the required torque with a total available torque of two motors in the target gear. However, when available torques of the respective motor are estimated in the target gear when the SS point is detected, the HCU 240 may use the corresponding value to set the engine operating point in the future.

According to an embodiment described so far, the EV kick-down control is summarized in a flowchart as shown in FIG. 5.

FIG. 5 is a flowchart showing an example of a process of performing a type of EV kick-down control in a hybrid electric vehicle according to an embodiment of the present disclosure.

In FIG. 5, the HCU 240 may determine whether the EV kick-down situation is present (S501). As described above, the EV kick-down situation may be referred to as a situation in which switching from the EV mode to the HEV mode and the kick-down shift are required together.

When it is determined as the EV kick-down situation (Yes in S501), the HCU 240 may be controlled to start the engine 110 in order to switch from the EV mode to the HEV mode (S502). For example, the cranking of the engine 110 may be performed by the first engine 120.

The HCU 240 is on standby for information about the shift phase from the transmission control unit 250 (S503). When the information on the shift phase corresponds to the SS point (Yes in S503), the available torque for respective motors in the target gear may be determined (S504). For example, the available torque for respective motors may be obtained by dividing the RPM of an expected transmission terminal from the maximum discharging power for respective motors in the target gear. Here, the available torque for respective motors is limited by the maximum discharging power and may be referred to as a discharging limitation torque.

The HCU 240 may confirm whether the engine clutch 130 is engaged before starting to control the engine torque and the first motor torque according to an embodiment (S505). When the engine clutch 130 is engaged (Yes in S505), the HCU 240 may perform the operating point control for the respective drive source according to an embodiment until the shift phase passes the SF point (S506) (S506 to S509A or S509B).

In particular, the HCU 240 may determine whether a torque condition is satisfied in the case of the sequential type (No in S507) according to the shift type before the SF point elapses (No in S506) (S508). Here, the torque condition may be satisfied when a difference between a value obtained by subtracting the actual engine output torque from the required torque and a value obtained by adding the available torque of respective motors in the target gear is greater than or equal to a preset reference value.

If the torque condition is not satisfied (No in S508), the HCU 240 may control the engine 110 with the ground torque and may determine an operating point for respective motors so that a value obtained by subtracting the actual engine output torque from the required torque satisfies the total torque of two motors 120 and 140 (S509A). For example, the torque of the second motor 140 may be determined as 'Max. (Min. required torque—Engine torque, second motor discharging limitation torque), 0) and the torque of the first motor 120 determined as 'Max. (Min. (Required torque—second motor torque, first motor discharging limitation torque), 0). However, this is exemplary and is not necessarily limited thereto.

On the other hand, when the torque condition is satisfied (Yes in S508) or skip type (Yes in S507), the HCU 240 may control the torque of the respective motor as the discharging limitation torque. The engine torque may be controlled by a difference between the required torque and the total torque of two motors (i.e., the amount of unsatisfactory required torque) (S509B).

When the SF point elapses while controlling the driving points of the drive sources 110, 120, and 140 according to an embodiment, the HCU may control the operating points of respective drive sources with a part-load or a full-load according to the default operating point control method (S510).

The present disclosure mentioned in the foregoing description may be implemented as code that can be written to a computer-readable recording medium and can thus be read by a computer system. The computer-readable medium may include all kinds of recording devices in which data readable by a computer system is stored. Examples of computer-readable medium include hard disk drive (HHD), solid-state disk (SSD), silicon disk drive (SDD), ROM, RAM, CD-ROM, magnetic tape, floppy disk, optical data storage device, and the like. Therefore, the above embodiments are to be construed in all aspects as illustrative and not restrictive. The scope of the present disclosure should be determined by the appended claims and their legal equivalents, not by the above description, and all changes coming within the meaning and equivalent range of the appended claims are intended to be embraced therein.

What is claimed is:

1. A method for controlling a hybrid electric vehicle, the method comprising:

in response to switching from an electric vehicle (EV) mode to a hybrid electric vehicle (HEV) mode and receiving an input indicative of a kick-down shift from a transmission control unit, determining an available torque in a target gear for each of a first motor and a second motor, wherein the first motor is directly connected to an engine and the second motor is configured to be connected to the first motor in the HEV mode by engaging an engine clutch disposed between the first motor and the second motor;

determining operating points of the first motor and the second motor before an actual shift of a stepped transmission ends, based on the determined respective available torques and types of the kick-down shift; and controlling the first motor and the second motor based on the determined operating points until the actual shift ends.

2. The method of claim 1, wherein determining the available torque is performed from a shift control start point during a shift phase after the engine is started.

3. The method of claim 1, wherein determining the available torque is performed after the engine clutch is engaged.

4. The method of claim 1, wherein the types of the kick-down shift include a first type in which the target gear is one stage lower than a current gear, and a second type in which the target gear is two or more stages lower than the current gear.

5. The method of claim 4, wherein when the type of the kick-down shift is the first type, determining the operating point includes: determining whether a predetermined torque condition is satisfied based on the determined respective available torques, an actual engine output torque, and a required torque.

6. The method of claim 5, wherein the predetermined torque condition is satisfied when a difference between a value obtained by subtracting the actual engine output torque from a sum of the determined respective available torques is greater than or equal to a preset reference value.

7. The method of claim 5, wherein when the predetermined torque condition is satisfied or the type of the kick-down shift is the second type, determining the operating point includes:

determining torques of the first motor and the second motor as the determined respective available torques; and determining a torque of the engine as a difference between the required torque and a sum of the determined respective available torques.

8. The method of claim 5, wherein when the predetermined torque condition is not satisfied, determining the operating point further includes:

determining a torque of the engine as a ground torque; and determining torques of the first motor and the second motor to satisfy a value obtained by subtracting the actual engine output torque from the required torque.

9. The method of claim 8, wherein the actual engine output torque is a value obtained by subtracting a friction torque of the engine from the ground torque.

10. A non-transitory computer-readable recording medium configured to record a program, the program to direct a processor to perform acts of:

in response to switching from an electric vehicle (EV) mode to a hybrid electric vehicle (HEV) mode and receiving an input indicative of a kick-down shift from a transmission control unit, determining an available torque in a target gear for each of a first motor directly connected to an engine and a second motor, wherein the first motor is directly connected to an engine and the second motor is configured to be connected to the first motor in the HEV mode by engaging an engine clutch disposed between the first motor and the second motor;

determining operating points of the first motor and the second motor before an actual shift of a stepped transmission ends, based on the determined respective available torques and types of the kick-down shift; and controlling the first motor and the second motor based on the determined operating points until the actual shift ends.

11. A hybrid electric vehicle comprising:

an engine;

a first motor directly connected to the engine;

a second motor configured to be connected to the first motor in a hybrid electric vehicle (HEV) mode;

a stepped transmission of which an input terminal is connected to the second motor;

an engine clutch disposed between the first motor and the second motor, wherein the second motor is configured to be connected to the first motor in the HEV mode by engaging the engine clutch;

a control unit configured to: in response to switching a driving mode from an electric vehicle (EV) mode to the hybrid electric vehicle (HEV) mode and receiving an input indicative of a kick-down shift from a transmission control unit, determine an available torque in a target gear for each of the first motor and the second motor, respectively; determine operating point of the engine, the first motor, and the second motor before an actual shift of the stepped transmission ends, based on the determined respective available torques and a type of kick-down shift; and control the first motor and the second motor based on the determined operating points until the actual shift ends.

12. The hybrid electric vehicle of claim 11, wherein the control unit is further configured to determine the available torques from a shift control start point during a shift phase after the engine is started.

13. The hybrid electric vehicle of claim 11, wherein the control unit is further configured to determine the operating point after the engine clutch is engaged.

14. The hybrid electric vehicle of claim 11, wherein the type of kick-down shift comprises a first type in which the target gear is one stage lower than a current gear, and a second type in which the target gear is two or more stages lower than the current gear.

15. The hybrid electric vehicle of claim 14, wherein when the type of the kick-down shift is the first type, the control unit is further configured to determine whether a preset torque condition is satisfied based on the determined respective available torques, actual engine output torque, and required torque.

16. The hybrid electric vehicle of claim 15, wherein the preset torque condition is satisfied when a difference between a value obtained by subtracting the actual engine output torque from a sum of the determined respective available torques is greater than or equal to a preset reference value.

17. The hybrid electric vehicle of claim 15, wherein when the preset torque condition is satisfied, or the type of the kick-down shift is the second type, the control unit is further configured to determine torques of the first motor and the second motor as the determined respective available torques and determine a torque of the engine as a difference between the required torque and a sum of the determined respective available torques.

18. The hybrid electric vehicle of claim 15, wherein when the preset torque condition is not satisfied, the control unit is further configured to determine a torque of the engine as a ground torque and determine a sum of the torques of the first motor and the second motor to satisfy a value obtained by subtracting the actual engine output torque from the required torque.

19. The hybrid electric vehicle of claim 18, wherein the actual engine output torque is a value obtained by subtracting a friction torque of the engine from the ground torque.

* * * * *